(12) United States Patent
Banks et al.

(10) Patent No.: US 10,104,365 B2
(45) Date of Patent: Oct. 16, 2018

(54) METHOD AND SYSTEM FOR ROBUST AND EXTENDED ILLUMINATION WAVEFORMS FOR DEPTH SENSING IN 3D IMAGING

(71) Applicant: TetraVue, Inc., Carlsbad, CA (US)

(72) Inventors: Paul S. Banks, San Marcos, CA (US); Bodo Schmidt, Carlsbad, CA (US); C. Stewart Tuvey, Carlsbad, CA (US)

( * ) Notice: Subject to any disclaimer, the term of this patent is extended or adjusted under 35 U.S.C. 154(b) by 82 days.

(21) Appl. No.: 14/696,793

(22) Filed: Apr. 27, 2015

(65) Prior Publication Data

US 2015/0312554 A1  Oct. 29, 2015

Related U.S. Application Data

(60) Provisional application No. 61/984,747, filed on Apr. 26, 2014.

(51) Int. Cl.
*H04N 13/02* (2006.01)
*G01S 17/10* (2006.01)
(Continued)

(52) U.S. Cl.
CPC ......... *H04N 13/254* (2018.05); *G01S 7/4814* (2013.01); *G01S 7/4816* (2013.01); *G01S 7/499* (2013.01); *G01S 17/10* (2013.01); *G01S 17/89* (2013.01); *H04N 13/0253* (2013.01); *H04N 13/271* (2018.05)

(58) Field of Classification Search
None
See application file for complete search history.

(56) References Cited

U.S. PATENT DOCUMENTS 3,569,988 A   3/1971  Schmidt et al.
3,644,017 A   2/1972  Ploss
(Continued)

FOREIGN PATENT DOCUMENTS

DE   4439298 A1   6/1996

OTHER PUBLICATIONS

Skeldon, M.D. et al., "Performance of longitudinal mode KD P Pockels cells with transparent conductive coatings," SPIE vol. 1410 Solid State Lasers II (1991), pp. 116-124.
(Continued)

*Primary Examiner* — Reza Aghevli
(74) *Attorney, Agent, or Firm* — Gavrilovich, Dodd and Lindsey LLP

(57) ABSTRACT

The methods and systems disclosed herein improve upon previous 3D imaging techniques by making use of a longer illumination pulse to obtain the same or nearly the same range resolution as can be achieved by using a much shorter, conventional laser pulse. For example, a longer illumination pulse can be produced by one or more Q-switched lasers that produce, for example, 5, 10, 20 ns or longer pulses. In some instances, the laser pulse can be longer than the modulation waveform of a MIS-type imaging system and still produce a repeatable response function. The light pulse generation technologies required to achieve longer pulse lengths can be significantly less expensive and less complex than known technologies presently used to generate shorter illumination pulse lengths. Lower-cost, lower-complexity light pulse sources may facilitate lower-cost, commercial 3D camera products.

16 Claims, 8 Drawing Sheets

(51) Int. Cl.
*G01S 17/89* (2006.01)
*H04N 13/254* (2018.01)
*H04N 13/271* (2018.01)
*G01S 7/481* (2006.01)
*G01S 7/499* (2006.01)

(56) References Cited

U.S. PATENT DOCUMENTS

| | | | |
|---|---|---|---|
| 3,838,906 A | 10/1974 | Kumada | |
| 4,734,575 A | 3/1988 | Wagli et al. | |
| 4,935,616 A | 6/1990 | Scott | |
| 4,967,270 A | 10/1990 | Ulich et al. | |
| 5,144,482 A | 9/1992 | Gould | |
| 5,157,451 A | 10/1992 | Taboada et al. | |
| 5,162,861 A | 11/1992 | Tamburino et al. | |
| 5,200,793 A | 4/1993 | Ulich et al. | |
| 5,394,413 A | 2/1995 | Zayhowski | |
| 5,686,990 A | 11/1997 | Laznicka, Jr. | |
| 6,088,086 A | 7/2000 | Muguira et al. | |
| 6,456,793 B1 | 9/2002 | Ray et al. | |
| 6,515,737 B2 | 2/2003 | Perry | |
| 6,781,763 B1 | 8/2004 | Tamburino et al. | |
| 7,212,278 B2* | 5/2007 | Doemens | G01S 7/487 356/5.01 |
| 7,224,382 B2 | 5/2007 | Baker | |
| 7,224,384 B1 | 5/2007 | Iddan et al. | |
| 7,301,138 B2 | 11/2007 | Yafuso | |
| 7,444,013 B2 | 10/2008 | Chen | |
| 7,746,450 B2* | 6/2010 | Willner | G01S 7/491 356/28 |
| 7,751,109 B1 | 7/2010 | Hoffman et al. | |
| 7,995,191 B1 | 8/2011 | Sandusky | |
| 8,106,940 B2 | 1/2012 | Takagi et al. | |
| 8,471,895 B2* | 6/2013 | Banks | G01S 7/4816 348/46 |
| 8,611,610 B2* | 12/2013 | Park | G06T 7/521 250/214 R |
| 9,007,439 B2* | 4/2015 | Banks | G01S 7/4816 348/46 |
| 9,330,464 B1* | 5/2016 | Ackerman | G01S 17/89 |
| 2002/0085608 A1 | 7/2002 | Kopf et al. | |
| 2002/0139853 A1 | 10/2002 | Tsikos et al. | |
| 2003/0089779 A1 | 5/2003 | Giordano et al. | |
| 2004/0041082 A1 | 3/2004 | Harmon | |
| 2004/0165080 A1 | 8/2004 | Burks et al. | |
| 2004/0233416 A1 | 11/2004 | Doemens et al. | |
| 2006/0077395 A1 | 4/2006 | Chan et al. | |
| 2007/0041075 A1 | 2/2007 | Gupta et al. | |
| 2008/0030611 A1 | 2/2008 | Jenkins | |
| 2008/0060034 A1 | 3/2008 | Egnal et al. | |
| 2008/0150786 A1 | 6/2008 | Breed | |
| 2009/0059201 A1 | 3/2009 | Willner | |
| 2009/0147112 A1 | 6/2009 | Baldwin | |
| 2010/0102210 A1* | 4/2010 | Guyon | G01N 21/4795 250/216 |
| 2010/0128109 A1* | 5/2010 | Banks | G01S 7/4816 348/46 |
| 2011/0175981 A1* | 7/2011 | Lai | H01L 27/14621 348/46 |
| 2011/0176709 A1 | 7/2011 | Park et al. | |
| 2012/0038892 A1* | 2/2012 | Kurtz | H04N 9/3105 353/31 |
| 2013/0088726 A1* | 4/2013 | Goyal | G01S 7/4866 356/634 |
| 2013/0278713 A1 | 10/2013 | Banks | |
| 2014/0098358 A1* | 4/2014 | Koers | G01S 17/89 356/5.01 |
| 2014/0347676 A1* | 11/2014 | Velten | G01B 11/2513 356/614 |

OTHER PUBLICATIONS

Turner, Monte, "Standoff Precision ID in 3-D (SPI-3D)," DARPA website page at http://www.darpa.mil/ipto/programs/spi3d/spi3d_vision.asp, Jan. 12, 2009.

West E.A. et al., "Large Field-of-View KD P Modulator for Solar Polarization Measurements," Solar Polarization 4, ASP Conference Series, vol. 358, pp. 209-212 (2006).

West, ED, "DC Bias Modulation Characteristics of Longitudinal KD P Modulators," SPIE vol. 1746, Polarization Analysis and Measurement, pp. 386-394 (1992).

West, Ed, "Large Field-of-View KD P Modulator for Solar Polarization Measurements," SPIE 5888-6, pp. 1-9 (2005).

West, ED, "Large Field-of-View KD P Modulator," SPIE vol. 1317 Polarimetry: Radar, Infrared, Visible, Ultraviolet, and X-Ray, pp. 312-323 (1990).

Zarrabi, Joseph, "A Compact and Multi-Purpose Diode-pumpd Unstable Laser with Dual Pulse width Output," General Atomics, Photonics Division, San Diego, CA, pp. 1-12 (2006).

Kawakita, Mashiro, "Gain-modulated Axi-Vision Camera (high speed high-accuracy depth-mapping camera)," Optics Express, vol. 12, No. 22, pp. 5336-5344 (Nov. 11, 2004).

Carpenter, Robert, "The Electro-Optic Effect in Uniaxial Crystals of the Dihydrogen Phosphate Type III. Measurement of Coefficients," Journal of the Optical Society of America, vol. 4, No. 4, pp. 225-229 (Apr. 1950).

Billings, Bruce, "The Electro-Optic Effect in Uniaxial Crystals of the Dihydrogen Phosphate ($XH_2PO_4$) Type. IV. Angular Field of the Electro-Optic Shutter," Journal of the Optical Society of America, vol. 42, No. 1, pp. 12-20 (Jan. 1952).

Billings, Bruce, "The Electro-Optic Effect in Uniaxial Crystals of the Type X $H_2PO_4$. I. Theoretical," Journal of the Optical Society of America, vol. 39, No. 10, pp. 797-801 (Oct. 1949).

Billings, Bruce, "The Electro-Optic Effect in Uniaxial Crystals of the Type $XH_2PO_4$. II. Experimental," Journal of the Optical Society of America, vol. 39, No. 10, pp. 802-808 (Oct. 1949).

Billings, Bruce, "Scalar Polarization Fringes Produced by the Superposition of Crystalline Plates," Journal of the Optical Society of America, vol. 34, No. 5, pp. 267-269 (May 1944).

Enemark, E.A. et al., "A Pockels Cell Light Modulator for Wide Angle Radiation," The Review of Scientific Instruments, vol. 40, No. 1, pp. 40-41 (Jan. 1969).

Lange, R. et al., "Time-of-flight range imaging with a custom solid-state image sensor," Laser Metrology and Inspection, Proc. SPIE, vol. 3823, pp. 1-12, Munich, Germany (1999).

Marino, Richard et al., "A compact 3D imaging laser radar system using Geiger-mode APD arrays: system and measurements," Laser Radar Technology and Applications VIII, Proceedings of SPIE vol. 5086, pp. 1-15 (2003).

Ringbeck, Thorsten et al., "A 3D Time of Flight Camera for Object Detection," Optical 3-D Measurement Techniques 09-12.07.2007 ETH Zurich Plenary Session 1: Range Imaging I, 10 pages (2007).

Blaine Copenheaver, PCT Search Report and Written Opinion of the International Searching Authority, Intl. Appl. No. PCT/US2015/027797, dated Jul. 24, 2015, 9 pages.

Google online patent translation of DE4439298A1, Jul. 1, 2014.

Grubl, Alexander, EPO Search Report for counterpart EPO application 15782223.0, dated Dec. 1, 2017.

* cited by examiner

METHOD AND SYSTEM FOR ROBUST AND EXTENDED ILLUMINATION WAVEFORMS FOR DEPTH SENSING IN 3D IMAGING

CLAIM OF PRIORITY UNDER 35 U.S.C. § 119

The present Application for patent claims priority to Provisional Application No. 61/984,747; entitled "Method and System for Robust and Extended Illumination Waveforms for Depth Sensing in 3D Imaging," filed Apr. 26, 2014, and hereby expressly incorporated by reference in its entirety as though set forth fully herein.

ACKNOWLEDGMENT OF GOVERNMENT SUPPORT

This application was made with Government support under Grant No. IIP-0945402, awarded by the National Science Foundation. The government has certain rights in the application.

TECHNICAL FIELD

The present disclosure pertains to the field of imaging and three-dimensional (3D) imaging. More particularly, the disclosure pertains to light-pulse illuminated 3D imaging.

BACKGROUND

Digital electronics have made it possible to record a grey scale or color image of a scene, as a still image, as a series of still images, or as a video. A video is a series of still images that continues for an extended period of time at a specific interval between each image. Analog imaging utilizes photographic film to obtain an image, whereas digital imaging utilizes a focal plane array (FPA) to obtain an image which provides a signal in response to light illumination that is then digitized. The FPA includes an array of light-detecting elements, or pixels, positioned at a focal plane of optics that image a scene. Much recent effort has been made to improve the density, size, sensitivity, dynamic range, and noise characteristics of FPAs, as well as the associated optics and electronics, enabling higher resolution images to be acquired.

The vast majority of imaging only acquires information in two dimensions, resulting in the flat images that are composed of an intensity value in a two-dimensional array. The position in the array is related to the position transverse to the direction the imaging system is pointing. Some imaging systems have added additional components that allow the measurement of the distance from the imaging system to the object(s) in the scene—that is, measurement of the "z-axis." These 3D imaging systems provide an intensity and a distance for each pixel in the FPA. Many of these 3D imaging systems make use of a laser pulse that is transmitted by the imaging system to illuminate object(s) in the scene, and the system measures in some fashion the time required for the laser pulse to travel to the objects in the scene and return to the imaging system in order to measure the distance between the system and object(s) in the scene. As a class, these 3D imaging systems are generally referred to as time-of-flight 3D imaging systems.

Various techniques are used in current 3D imaging systems to make the distance measurement. For example, Advanced Scientific Concepts, Inc. of Santa Barbara, Calif. produces a system that uses an FPA where each pixel element is time-sensitive and is coupled with a high bandwidth read-out integrated circuit (ROIC) and a high bandwidth analog-to-digital converter (ADC) to generate a digital representation of the temporal profile of the returned light signal. Another technique is to modulate the output illumination from an array of LEDs, for example, and use a different type of time-sensitive FPA. Still another technique developed by the U.S. Air Force Laser Imaging and Ranging System (LIMARS) program uses an electro-optic modulator to produce an intensity value that is dependent on the timing of the returning light signal, referred to as a modulated imaging system (MIS). In all of these techniques, the length of the light pulse emitted by the 3D imaging system is short relative to the distance resolution desired. It is generally believed that using a longer light pulse or a slower modulation frequency to illuminate a scene in these systems will decrease the precision of the 3D imaging system. As used in this context, precision is related to the z-axis distance resolution that can be obtained by a 3D imaging system.

For high-precision distance measurement applications, it is necessary to obtain distance measurements with a resolution of millimeters or centimeters. Because the speed of light is typically around 300,000,000 m/s, a light pulse travels 1 mm in 3 ps and travels 1 cm in 30 ps. When current 3D imaging systems using light pulses of approximately 1-3 ns, that is equivalent to the light pulse having an extent of 30-90 cm. Thus, according to the conventional wisdom of those skilled in the art, these light pulses are too long to provide precise distance measurements in some applications requiring precision in the millimeter or low centimeter range. This is one of the principal reasons that current time-of-flight 3D imaging systems are limited to distance resolutions of greater than approximately 10 cm, even for scenes at close range.

SUMMARY

As described herein, a system and method of three-dimensional imaging achieve high resolution distance measurement using illumination light pulses of longer length than are currently used in some 3D imaging systems. Specifically, the disclosed systems and methods capture information about the ranges and shapes of multiple objects in a scene, which may be positioned at a variety of distances, with relatively high resolution, e.g., sub-centimeter or low centimeter distance resolution.

In accordance with one aspect, the 3D imaging system uses longer illumination light pulses than in previous work. For example, in a MIS-type imaging system, illumination light pulses used by the system may be approximately 20% of the modulation waveform length. In a MIS-type system, the modulation waveform length determines the period of time over which returning light from the pulse is modulated in order to identify its approximate return time. The z-axis distance resolution in such systems is a fraction of the modulation waveform length.

In another example, the illumination pulses in a MIS-type system may be approximately the same length as the modulation waveform length. In a further example, the light pulse length is greater than the modulation waveform length.

These pulse lengths are substantially longer than those used in known MIS-type 3D imaging systems. Contrary to generally accepted beliefs of those in this technical field, the inventors have discovered that longer illumination light pulses may be successfully used in MIS-type 3D imaging systems with only minor or insignificant changes in the distance resolution of these systems. This discovery is significant because the laser technologies required to achieve longer pulse lengths can be significantly less expensive than laser technologies that generate shorter pulse lengths. Also, known short pulse technologies are not compatible with certain materials and laser designs, and further, they may greatly restrict the flexibility of the pulse source design. Thus, commercial imaging systems that are price sensitive would benefit immensely from a 3D imaging system that uses longer illumination light pulses while still achieving high distance resolutions. In addition, by using longer light pulses, the sensitivity to high frequency structure on the laser light pulse, and sensitivity to changes in that structure, may be reduced.

Other aspects, features, and advantages will be or will become apparent to one with skill in the art upon examination of the following figures and detailed description. It is intended that all such additional features, aspects, and advantages be included within this description and be protected by the accompanying claims.

BRIEF DESCRIPTION OF THE DRAWING

It is to be understood that the drawings are solely for purpose of illustration and do not define the limits of what is claimed. Furthermore, the components in the figures are not necessarily to scale. In the figures, like reference numerals designate corresponding parts throughout the different views.

DETAILED DESCRIPTION

Figure 1:
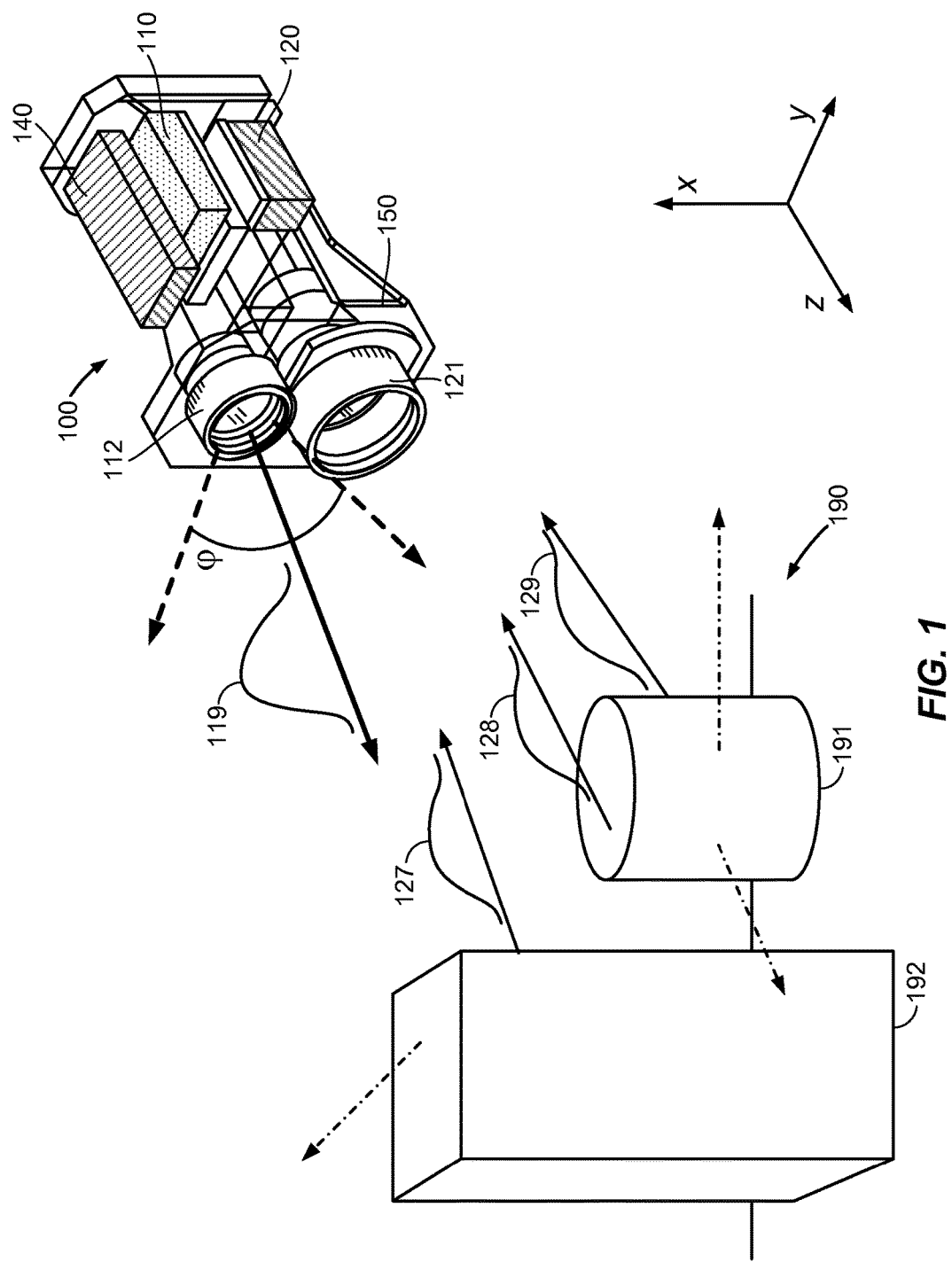
FIG. 1 illustrates a perspective view of an exemplary system for obtaining a three-dimensional image of a scene.

The following detailed description, which references to and incorporates the drawings, describes and illustrates one or more specific embodiments of the systems and methods. These embodiments, offered not to limit but only to exemplify and teach the methods and systems, are shown and described in sufficient detail to enable those skilled in the art to practice the techniques. Thus, where appropriate to avoid obscuring the systems and methods, the description may omit certain information known to those of skill in the art. The embodiments disclosed herein are examples that should not be read to unduly limit the scope of any claims.

The word "exemplary" is used throughout this disclosure to mean "serving as an example, instance, or illustration." Any embodiment or feature described herein as "exemplary" is not necessarily to be construed as preferred or advantageous over other embodiments or features.

Disclosed herein are systems and methods for obtaining high resolution images of scenes, including wide field of view scenes. Specifically, the systems and methods may simultaneously record three-dimensional position information for multiple objects in a scene with high spatial and distance resolution, along with intensity (grey-scale or color) information about the scene. This information, both coordinate and intensity, is recorded for every pixel in an array of pixels for each image. The intensity and position information are combined into a single three-dimensional image that approximates a human view of the scene, and which further records the three-dimensional coordinates of the shape and relative position of each object in the scene.

A series of such images may be acquired in similar fashion to a digital video camera, providing a "movie" of changes in the scene over time, each three-dimensional image in the movie being referred to as a frame. In many circumstances, the scene being imaged may include many objects at a variety of distances from the system. The system records the three-dimensional coordinate and intensity of the portion of an object corresponding to each pixel element, thus providing the three-dimensional shape of each individual object in the scene as well as the overall coordinates, with respect to the three-dimensional imaging device as well as other portions of the scene in the image recorded by the three-dimensional imaging device, of the objects in the scene. If an absolute frame of reference is desired, a GPS unit or other suitable means for fixing the absolute position of the imaging system may be included in the system. In some embodiments, known locations of objects within the scene may be used for fixing the absolute position of the imaging system.

Examples of 3D imaging systems and methods that may be modified to implement the methods and systems described herein are disclosed in U.S. Pat. No. 8,471,895 B2 issued on Jun. 25, 2013, which is incorporated by reference herein in its entirety (referred to herein as the "'895 patent"). For example, FIGS. 5, 11 and 12 of the '895 patent describe MIS-type 3D imaging systems that can be configured to perform the methods disclosed in the present application. The modifications to the systems and methods of the '895 patent would involve changing the output laser pulse lengths and modulation waveforms to the laser pulse lengths and modulation waveforms such as those disclosed in the present application, for example.

FIG. 1 illustrates a perspective view of an example 3D camera system 100 for obtaining a three-dimensional, wide FOV image of a scene 190. Although the system 100 is described with reference to the Cartesian coordinate system, other coordinate systems may be used.

As illustrated in FIG. 1, the 3D camera system 100 includes illumination subsystem 110, sensor subsystem 120, processing subsystem 140, and body 150 in which the various subsystems are mounted. Body 150 may further include a protective cover, not shown. The particular form of system 100 may vary depending on the desired performance parameters and intended application. For example, if system 100 is intended for household use, it will preferably be sufficiently small and light as to be held by a single hand, similar to a camcorder, and may be configured to record relatively close scenes with a modest resolution. Alternatively, if system 100 is intended for surveying a building site, then it may be configured to image large and/or distant scenes with high resolution, and the size of the system will be of secondary consideration.

Illumination subsystem 110 includes a light source or sources, not shown in FIG. 1 but described in greater detail below, and transmission lens 112, which may include a single lens, a compound lens, or a combination of lenses. The light source is configured to generate light pulse 119, which may have any suitable duration, for example, 10 nanoseconds or less, as described herein. Transmission lens 112 is configured to increase the divergence of pulse 119 to an angle φ of 1 degrees or greater, for example between 1 and 180 degrees, or between 1 and 120 degrees, or between 2 and 90 degrees, or between 2 and 40 degrees, or between 5 and 40 degrees, and to direct the pulse toward the scene such that the pulse irradiates a portion of scene 190 to be imaged.

Objects 191 and 192 in scene 190 are each at different positions in the x-, y-, and z-directions in a Cartesian coordinate system, (or in the ρ-, θ-, - and φ-directions in a spherical coordinate system) and also have different shapes. As such, different portions of the laser pulse will travel different distances to irradiate the objects 191, 192, as well as to irradiate different features or areas of each object individually, before the objects scatter and/or reflect the pulse portions 127, 128, 129 back toward system 100. As such, each of pulse portions 127, 128, and 129 will have a different time of flight (TOF). Additionally, the pulse portions 127, 128, 129 have different intensities, depending on the reflectivity of the irradiated feature of each object, and the angle of that feature relative to system 100.

Sensor subsystem 120 includes large-aperture receiving lens 121 that collects reflected pulse portions 127, 128, 129. The appropriate aperture size will depend on the particular application, and may be between, for example, less than 1 cm and 2.5 cm. Other portions of the reflected pulse, e.g., those portions illustrated by dash-dot lines that are reflected in directions other than back toward system 100, may not be captured by receiving optics 121. As for transmission lens 112, receiving lens 121 may include a single lens, a compound lens, or a combination of lenses or other reflective or refractive elements. Receiving optics 121 may also collect broadband or multiband (e.g., visible) information about scene 190, e.g., ambient light that scene 190 scatters or reflects towards receiving optics 121. As such, for this case receiving lens 121 preferably is configured to reduce or eliminate possible aberrations known in the art of optical system design that may degrade image quality for one or more of the bands received. Alternatively, a separate receiving lens may be provided to receive the broadband or multiband light. The sensor subsystem 120 may include a separate visible imaging subsystem that records a color or grey-scale image of scene 190 based on visible light collected from the scene. Such an image may later be combined with position and shape information about the scene.

Figure 2:
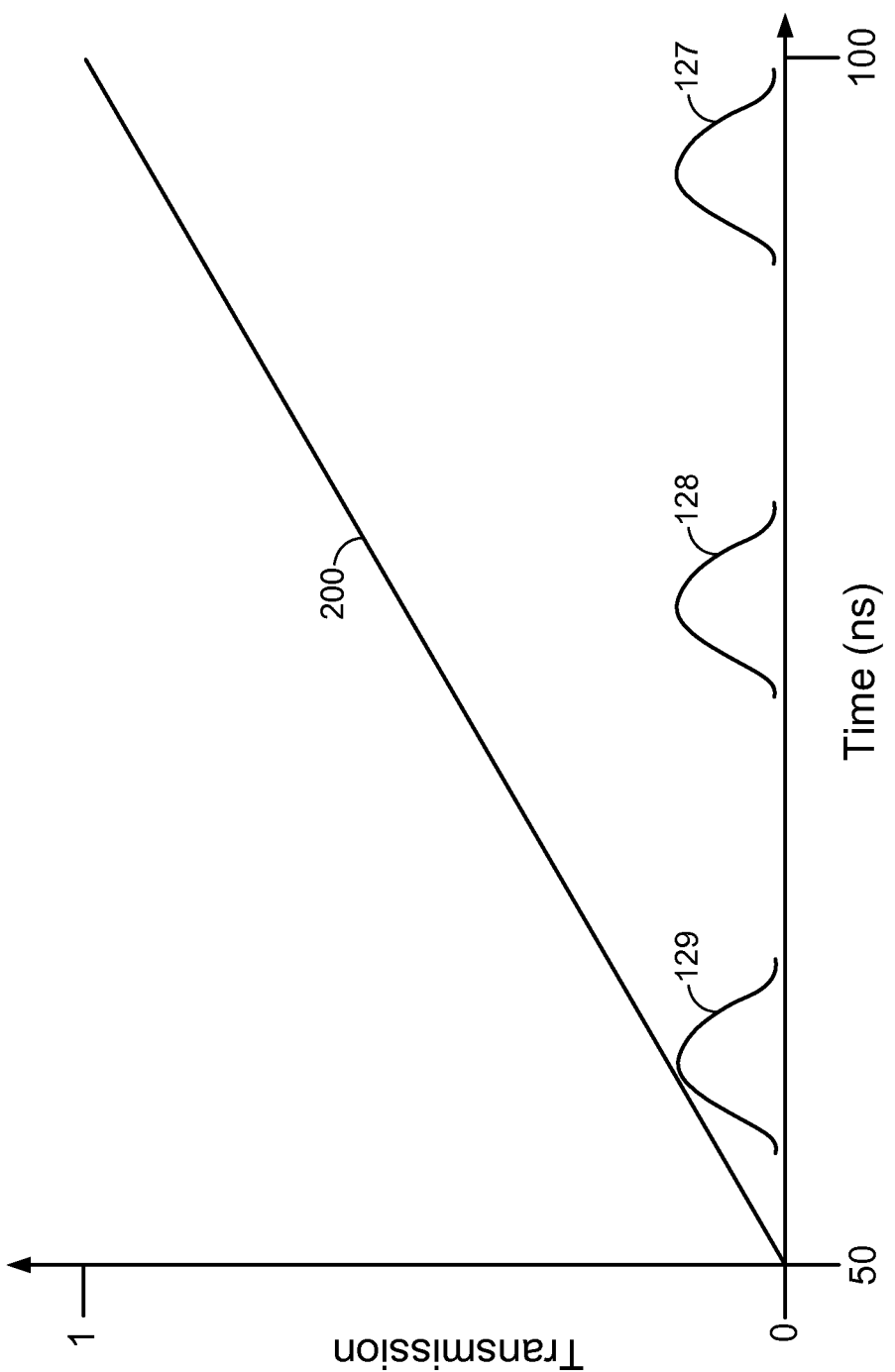
FIG. 2 is a graph illustrating the monotonic polarization modulation of light pulse portions reflected from the scene of FIG. 1.

The sensor subsystem 120 creates a plurality of images based on pulse portions 127, 128, 129 that receiving lens 121 collects. These images contain positional information about objects 191, 192 in scene 190. To create such images, sensor subsystem may vary the polarization state of the incoming pulse portions 127, 128, 129 as a function of time, e.g., using the wide field of view Pockels assembly, for example. When followed by an analyzer (e.g. a polarizing element placed after the Pockels cell), the corresponding transmission through the analyzer varies as a function of time. For example, as illustrated in FIG. 2, sensor subsystem 120 may vary the transmission 200 through the analyzer of light collected by receiving lens 121 from zero to one between times of 50 to 100 nanoseconds (where zero nanoseconds corresponds to the time the light pulse was generated). As such, pulse portions 127, 128, and 129, which are delayed in time relative to one another because they traveled different distances to and from objects in scene 190, experience different degrees of transmission than one another. Specifically, pulse portion 129 reflected from a closer portion of object 191 than did pulse portion 128, and so experiences less transmission than pulse portion 128. Pulse portion 127 reflected from further object 192, and so experiences more transmission than pulse portion 128. As such, the extent to which sensor subsystem 120 modulates the transmission of a pulse portion, encodes the TOF of that pulse portion on the intensity received by the FPA, and thus the distance that the pulse portion traveled to and from a particular feature of an object in a scene.

Modulating the polarization of the collected light pulse portions as a function of time may, for example, be a monotonic function of time, as illustrated in FIG. 2. In the example illustrated in FIG. 2, returned illumination light pulses with a shorter TOF will experience less polarization modulation than pulses with a longer TOF, enabling distance information to be obtained. However, such modulation need not necessarily be monotonic. Additionally, the intensity, rather than the polarization, of the collected light pulse portions, may be modulated.

The sensor subsystem 120 determines the extent of polarization of each pulse portion 127, 128, 129 by splitting each pulse into its orthogonal polarization components (e.g., H- and V-polarized components) using an optical element such as a prism or polarizing beamsplitter, and then recording complementary images of the two polarization components. For example, a first image generated from the scene 190 may contain information about the H-polarized component of pulse portions 127, 128, 129, in the form of intensity regions in the first image, respectively. A second image generated from the same scene 190 may contain information about the V-polarized component of pulse portions 127, 128, 129 in the form of intensity regions in the second image, respectively. The intensity regions vary in intensity based on the arrival time or the returned light pulse from the scene. Processor subsystem 140, illustrated in FIG. 1, may store the polarized images and perform further processing to obtain distance and shape information for objects 191, 192 in scene 190. For example, processor subsystem 140 may normalize the images to compensate for variations in reflectance or scattering between objects 191, 192. Processor subsystem 140 may then calculate the positions and shapes of different objects in scene 190 based on the normalized images, forming a three-dimensional image, which includes distance information about objects 191, 192. Further, processor subsystem 140 may combine the calculated distance information with the white light image to provide a three-dimensional image of scene 190 that includes grayscale or color information about the scene, thus mimicking a human view of the scene. Processor subsystem 140 may further control and coordinate the operation of illumination subsystem 110 and sensor subsystem 120.

In one illustrative embodiment, system 100 has a range resolution of about 1 mm at a range of 20 meters, and a range resolution of about 3 mm or less at a range of 100 meters.

For the MIS modulation technique, the distance resolution is a fraction of the modulation waveform length. The modulation waveform length determines the period of time over which returning light from the pulse is modulated in order to identify its approximate return time. For example, on its public website, DARPA reported for the SPI 3-D program (a LIMARS-type 3D imaging system) that the range resolution is $1/50$ of the ramp length. To achieve 1 cm resolution, the corresponding modulation ramp length would need to be less than 3 ns and the light pulse length would need to be significantly shorter: 300 ps or less. Achieving 1 mm distance resolution would require a 30 ps laser pulse length. It is possible to generate sub-nanosecond light pulses using known laser technology. However, the laser technologies required to achieve such short pulse lengths can be significantly more costly than laser technologies that generate pulse length greater than approximately 5 ns. Also, the short pulse technologies are not always compatible with certain materials or laser designs, and they also greatly restrict the flexibility of the light generation design. Commercial systems that are price sensitive would benefit from a 3D imaging system that uses longer illumination pulses while still achieving relatively high distance resolutions.

Figure 3:
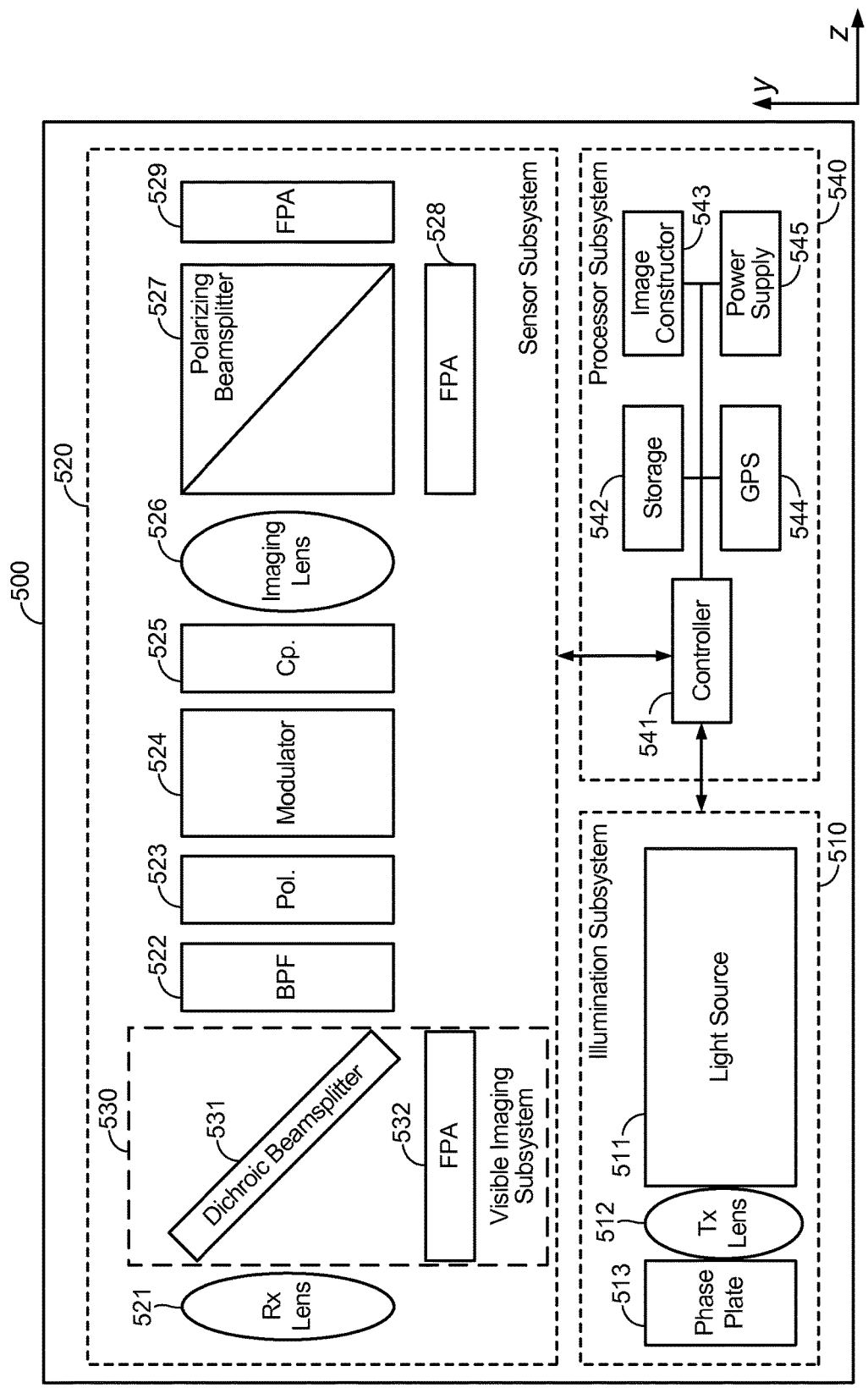
FIG. 3 is a block diagram schematically illustrating certain components in the system of FIG. 1.

FIG. 3 schematically illustrates selected components in an exemplary MIS-type three-dimensional imaging system 500. It should be appreciated that the functionality of system 500 may alternatively be provided with other optical arrangements, for example, as described in reference to FIGS. 6, 7A-B, 11 and 12 of the '895 patent.

As illustrated in FIG. 3, system 500 includes illumination subsystem 510, sensor subsystem 520, and processor subsystem 540. Each of these subsystems will now be described in greater detail.

The illumination subsystem 510 includes light source 511 for generating a light pulse, transmission (Tx) lens 512 for controlling the divergence of the generated light pulse, and optional phase plate or other beamshaping element 513 for enhancing the spatial profile of the light pulse. The positions of lens 512 and optional phase plate 513 may alternatively be reversed. These elements may also be combined in a single optic or set of optics. Illumination subsystem 510 is in operable communication with controller 541, which may control and/or monitor the emission of light pulses from light source 511, and which further may control and/or monitor the divergence that transmission lens 512 imparts on the generated light pulse.

As noted above, with reference to FIG. 1, the illumination subsystem generates a light pulse having a smooth spatial profile, a smooth temporal profile, and a divergence of between, for example, 5 and 40 degrees. In some embodiments, the temporal and spatial profiles may not be smooth and have large and small scale variation or structure. The light pulse may be in any suitable portion of the electromagnetic spectrum, for example, in the visible band (e.g., 400-700 nm) or in the near-infrared band (e.g., 700 nm-2500 nm). Generally, pulses generated in specific regions of the near-infrared band are considered to be more "eye-safe" than pulses of comparable power in the visible band. Light source 511 is configured to generate a light pulse in the desired electromagnetic band, and lens 512 and optional phase plate 513 are configured to provide that light pulse with the desired divergence and optionally further to enhance the pulse's spatial profile. In some embodiments, light source 511 is a laser producing light pulses having at least 5 µJ energy, or at least 100 µJ energy, or at least 1 mJ energy, or at least 10 mJ energy. Such laser energies may be relatively eye-safe because of the high divergence of the laser beam.

A low-coherence laser may be used as light source 511, as described, for example, in the '895 patent. Other light sources, such as light emitting diodes (LEDs) and laser diodes may alternatively be used.

For example, illumination subsystem 510 may generate a laser pulse having a large divergence, e.g., between 1 and 180, or between 1 and 90, or between 1 and 40, or between 2 and 40, or between 5 and 40 degrees of divergence, and low spatial and/or temporal coherence, whereas a diffraction-limited laser may have a divergence of only a fraction of a degree and a large amount of spatial and temporal coherence. The large divergence and lack of spatial and/or temporal coherence may reduce the amount of intensity fluctuations in the laser irradiance at the surfaces of objects being illuminated with the laser beam. The smoother intensity profile of the laser beam generated by illumination subsystem 510 may improve the performance of sensor subsystem 520.

The transmission (Tx) lens 512 may increase the divergence of the light pulse generated by light source 511. For example, although the light pulse from light source 511 may in some embodiments be relatively highly divergent compared to previously known lasers because the pulse contains many spatially and temporally incoherent modes, the pulse's divergence may in some circumstances still remain well below 1 degree. Lens 512 may be configured to increase the divergence of the light pulse to between 5 and 40 degrees, depending on the distance of the scene from system 500 and the portion thereof to be imaged. Lens 512 may include a single lens, or may include a compound lens, or may include a plurality of lenses or mirrors, that is/are configured to increase the divergence of the pulse to the desired degree, e.g., to between 1 and 180 degrees, or 1 and 120 degrees, or 1 and 90 degrees, or 2 and 90 degrees, or 2 and 40 degrees, 5 and 40 degrees, or between 5 and 30 degrees, or between 5 and 20 degrees, or between 5 and 10 degrees, or between 10 and 40 degrees, or between 20 and 40 degrees, or between 30 and 40 degrees, or between 10 and 30 degrees, for example. Divergences larger or smaller may also be used. In some embodiments, transmission lens 512 may be adjustable, so that a user may vary the divergence of the laser pulse to suit the particular situation. Such an adjustment may be manual (similar to the manual adjustment of a "zoom" lens), or may be automated. For example, controller 541 may be operably connected to transmission lens 512 so as to automatically control the degree of divergence that lens 512 imparts to the laser pulse. Such automatic control may be responsive to user input, or may be part of an automated scene-imaging sequence.

Illumination subsystem 510 optionally may further include phase plate 513, which is configured to further smooth the spatial profile of the light pulse generated by light source 511.

It should be noted that although illumination subsystem 510 includes light source 511, which is substantially monochromatic, it optionally may include additional types of light sources. For example, illumination subsystem 510 may include a white light source for illuminating the scene with white light. Or, for example, illumination subsystem 510 may include other substantially monochromatic light sources in spectral regions different from that emitted by light source 511. For example, where light source 511 generates laser pulses in one particular portion of the visible spectrum, such as in the green region, e.g., 532 nm, such pulses may cast that hue over the scene. In some circumstances, such as the filming of a movie, this may be undesirable. Illumination subsystem 510 may include one or more additional light sources that generate light that, when combined with the light from light source 511, result in the appearance of white light. For example, where light source 511 generates green laser pulses (e.g., 532 nm), illumination subsystem 510 optionally may further include diodes or lasers or other light sources that emit wavelengths in the red and blue regions, e.g., 620 nm and 470 nm, that, combined with the green laser pulses to produce an illumination that maintains the desired scene illumination characteristics.

Still referring to FIG. 3, system 500 further includes sensor subsystem 520, which receives portions of the light pulse, generated by illumination subsystem 510, that are reflected and/or scattered by objects in the scene. Optionally, sensor subsystem 520 also receives visible light from the scene, which light may be from ambient sources and/or may be produced by a separate light source in illumination subsystem 510. In the system illustrated in FIG. 3, sensor subsystem includes receiving (Rx) lens 521, band-pass filter (BPF) 522, polarizer (Pol.) 523, modulator 524, optional compensator (Cp.) 525, imaging lens 526, polarizing beamsplitter 527, and first and second FPAs 528, 529. Sensor subsystem optionally further includes white light imaging subsystem 530, which includes dichroic beamsplitter 531 and FPA 532. Sensor subsystem 520 is in operable communication with controller 541, which may monitor and/or control the operation of different components of the sensor subsystem, such as receiving lens 521, modulator 524, imaging lens 526, FPAs 528, 529, and optional FPA 532.

Receiving lens 521 collects light from the scene. As discussed above with reference to FIG. 1, the scene may scatter and/or reflect light in a variety of directions other than back toward the three-dimensional imaging system. Some of such light was generated by illumination subsystem 510, while other of such light may be white light or light in a different wavelength range, which may or may not have been generated by illumination subsystem 510. The amount of light collected is proportional to the area of the receiving aperture, e.g., is proportional to the area of receiving lens 521.

To enhance the amount of light collected by sensor subsystem 520, thus increasing the amount of information that ultimately may be contained in each three-dimensional image, receiving lens 521 is constructed to receive as much light as practicable for the given application. For example, for some applications in which the imaging system is designed to be lightweight and hand-held, with modest resolution requirements, receiving lens 521 may, for example, have a diameter of 1 to 4 inches, or 2 to 3 inches, or for example, about 2 inches, or smaller. For applications in which the imaging system is instead designed to provide high-resolution images for commercial purposes, receiving lens 521 may be made as large as practicably feasible, for example, having a diameter of 2 to 6 inches, or 2 to 4 inches, or 1 to 3 inches, or, for example, 4 inches or greater. The various optical components of sensor subsystem 520 preferably are configured so as to avoid clipping or vignetting the light collected by receiving lens 521 using techniques known in optical design. Additionally, receiving lens 521 and the other optical components or coatings also have a angular acceptance appropriate for the system design and field of view, e.g., of between 1 and 180 degrees, or between 1 and 120 degrees, or between 1 and 90 degrees, or between 2 and 40 degrees, or between 5 and 40 degrees, or less than 5 degrees, or less than 10 degrees.

Receiving lens 521 may include a single lens, or may include a compound lens, or may include a plurality of lenses or mirrors, that is/are configured to collect light from the scene and to image the collected light into an image plane at a defined position within sensor subsystem 520. Receiving lens 521 is configured to reduce or inhibit the introduction of spherical and chromatic aberrations onto the collected light. In some configurations, receiving lens 521 may be adjustable, so that a user may choose to adjust the position of the object plane of lens 521, or the distance at which the scene is imaged to the defined plan within sensor subsystem 520. In some configuration, receiving lens 521 can be adjusted to change the angular FOV. Such an adjustment may be manual (similar to the manual adjustment of a "zoom" lens), or may be automated. For example, controller 541 may be operably connected to receiving lens 521 so as to automatically control the position of the object plane of lens 521 or angular FOV of lens 521. In some configurations, these adjustments may be performed in part based on the beam divergence imparted by transmission lens 512 (which also may be controlled by controller 541). Such automatic control may be responsive to user input, or may be part of an automated scene-imaging sequence.

In the camera system illustrated in FIG. 3, sensor subsystem 520 includes visible imaging subsystem 530, so the light collected by receiving lens 521 is imaged at two image planes. Specifically, the collected light passes through dichroic beamsplitter 531, which is configured to redirect at least a portion of the collected visible light onto FPA 532, which is positioned in the image plane of receiving lens 521. In other configurations, the light collected by receiving lens 521 is imaged at a single image plane at FPA 532, and imaging lens 526 is not necessary. FPA 532 is configured to record a color or grey-scale image of the scene based on the visible light it receives, e.g., using previously known hardware and techniques. In some configurations, FPA 532 is substantially identical to first and second FPAs 528, 529, and is configured so that the visible light image it records is registered with the images that the first and second FPAs record. FPA 532 is in operable communication with controller 541, which obtains the image from FPA 532 and provides the obtained image to storage 542 for storage, which may be accessed by image constructor 543 to perform further processing. It should be appreciated that visible imaging subsystem 530 alternatively may be configured to obtain an image based on any other range of light, for example, any suitable broadband or multiband range(s) of light.

Light that dichroic beamsplitter 531 does not redirect to FPA 532 is instead transmitted to band-pass filter 522, which is configured to block light at wavelengths other than those generated by illumination subsystem 510 (e.g., has a bandwidth of .+−.5 nm, or .+−.10 nm, or .+−.25 nm), so that the remainder of sensor subsystem 520 receives substantially only the light pulse portions generated by illumination subsystem 510 that the scene reflects or scatters back towards system 500 (e.g., pulse portions 127, 128, 129 illustrated in FIG. 1). In configurations where the visible imaging subsystem is not present, the band-pass filter 522 may be positioned in front of the receiving lens 522. In other configurations, the band-pass filter 522 is positioned behind the modulator 524, or in front of the polarizing beamsplitter 527, or elsewhere in the optical chain. The light transmitted through band-pass filter 522 is then transmitted through polarizer 523, which eliminates light of polarization other than a desired polarization, e.g., so that the light transmitted therethrough is substantially all H-polarized, or substantially all V-polarized (or right handed circularly polarized, or left handed circularly polarized). Polarizer 523 may be, for example, a sheet polarizer, or a polarizing beamsplitter, and may be relatively insensitive to angle. For configurations with narrow fields of view or less wide angle light rays, the polarizer 523 may be more sensitive to angle. The light transmitted through polarizer 523 is then transmitted through modulator 524, which is positioned at the other image plane of receiving lens 521. The functionality of modulator 524 is described in greater detail below. In some embodiments, the image plane of receiving lens 521 is at a location in sensor subsystem 520 other than in modulator 524.

Modulator 524 optionally may be followed by compensator 525, which may correct phase errors that modulator 524 may impose on the beam due to variations in the beam angle, thus further enhancing the acceptance angle of modulator 524. Compensator 525 may include a material having the opposite birefringence of the material in modulator 524. For example, where modulator 524 includes potassium dihydrogen phosophate (KDP), compensator 525 may include magnesium fluoride ($MgF_2$) which has the opposite birefringence of KDP and is commercially available. Other materials may be suitable for use in compensator 525, depending on the characteristics of the material used in modulator 524, such as if the modulator material is potassium dideuterium phosphate (KD*P), compensator materials may be rutile, yttrium lithium fluoride (YLF), urea, or yttrium orthovanadate ($YVO_4$), among others. Additionally, the thickness of compensator 525 may be selected to provide an appropriate contrast ratio over the acceptance angle of the system. In one illustrative embodiment, compensator 525 includes a crystal of $MgF_2$ having a length between 8.78 mm and 8.82 mm for a modulator of KD*P of 3 mm length. The compensator 525 may comprise one or more crystals that sum to the proper thickness. For other modulator designs, such as modulator materials that are oriented such that the crystal axis is orthogonal to the optical axis, the compensator may be a second modulator with the crystal axis rotated 90 degrees about the optic axis.

Following transmission through and modulation by modulator 524 and optional compensator 525, imaging lens 526 images the modulated light onto first and second FPAs 528, 529. Specifically, polarizing beamsplitter 527 separates the orthogonal polarization components of the modulated beam (e.g., the H- and V-polarization components, or left- or right-handed circularly polarized components), which it then redirects or transmits, respectively, to first and second FPAs 528, 529, which are positioned in the image plane of imaging lens 526. Imaging lens 526 may include a single lens, a compound lens, or a plurality of lenses. In some embodiments, two imaging lens 526 may be placed after the polarizing beamsplitter 527, with one each in front of FPAs 528, 529. First and second FPAs 528, 529 record images of the modulated light imaged upon them, and are in operable communication with controller 541, which obtains the recorded images and provides them to storage 542 for storage and further processing by image constructor 543.

A description of various embodiments of modulator 524 and FPAs 528, 529 will now be provided. A description of the calculation of object positions and shapes within the scene will be provided further below with reference to processor subsystem 540.

As noted above with reference to FIG. 1, a modulator may be used to vary the polarization of the laser pulse portions reflected from the scene, allowing for the ranges and shapes of objects in the scene to be calculated with high precision. A Pockels cell or a Kerr cell may in some embodiments be used to perform such a modulation. However, previously known Pockets cells typically have relatively small apertures (e.g., 1 cm or smaller) and small acceptance angles (e.g., less than 1 degree) and operate at relatively high voltages, which may make them undesirable for use in imaging systems. Additionally, the angular extent of the reflected light received by the modulator may be magnified by the inverse of the magnification of the receiving optical elements. As such, it may be desirable to use a modulator having a wider acceptance angle, a wider aperture, and a lower operating voltage. For example, in the three-dimensional imaging system illustrated in FIG. 3, the light captured by receiving (Rx) lens 521 may have angles varying between 5 and 40 degrees and an aperture of 2-4 inches, for example, which a previously known Pockels cell may not be configured to properly modulate. Thus, it may be desirable to provide a polarization modulator having a large aperture, a low operating voltage, and a large acceptance angle, e.g., greater than 5 degrees, for example, between 5 and 40 degrees, while providing a sufficiently high contrast ratio, e.g., greater than 20:1, or greater than 50:1, or greater than 300:1, or greater than 500:1.

For embodiments in which the modulator is a Pockels cell, there are known techniques for increasing the angular acceptance bandwidth of a Pockels cell. These may be used in various embodiments of the invention. For example, in one embodiment, the Pockels cell may be made thin by using transparent electrodes. Decreasing the length increases the angular acceptance. Similarly, the modulator aperture may be increased by using transparent electrodes. In one illustrative example, modulator 524 is a longitudinal Pockels cell including a slab of potassium dideuterium phosphate (KD*P) having a thickness of less than 5 mm with transparent or semi-transparent electrodes disposed thereon or on protective windows placed proximate to the KDP surfaces, e.g., a coating of indium tin oxide (ITO), a conductive grid having a spacing selected to match the pixel spacing of FPAs 528, 529 to reduce diffraction losses, or any suitable combination of transparent film and metallic features.

Pockels cell materials have birefringence (different values of the refractive index for light polarized along different axes of the crystal structure) which further restricts the angular acceptance. However, for Pockels cell designs known as transverse cells, manufacturers have carefully matched the thickness of two identical cells, rotating the cells 90 degrees about the propagation axis. One cell then cancels out the contribution of the other. For some materials and orientations, it may be necessary to use four cells. This also may make the cells relatively insensitive to effects caused by temperature changes. Such a technique may not work for longitudinal Pockels cells, but in this case, additional material is added. The material has birefringence of opposite sign and the thickness is carefully matched. For example, potassium dihydrogen phosphate (KD*P) is a common material for longitudinal cells and is negatively birefringent. Positively birefringent materials are also available, such as $MgF_2$. These techniques may allow for a high angular acceptance for a Pockels cell modulator.

Although system 500 of FIG. 3 is described as including a Pockels cell-based modulator, other types of modulators may be used to encode the TOFs of reflected/scattered pulse portions from the scene as an intensity modulation on an FPA. Such an arrangement may not directly modulate the light, but instead may modulate the amplitude of the signal generated by the photoelectrons measured by the circuits of the FPAs. For example, in one alternative configuration, polarizer 523, modulator 524, and compensator 525 are omitted, and the gain of the pixels of FPA 529 is modulated as a function of time, whereas the gain of the pixels of FPA 528 are not modulated as a function of time. In this embodiment, the polarizing beamsplitter 527 would be replaced by a nonpolarizing beamsplitter. An FPA includes an array of photosensitive sites (referred to as pixels) with accompanying circuitry to measure the total charge created by incident photons. Some of the circuitry is configured to amplify the signal generated by photoelectrons in the pixel so as to produce gain (the fraction of the measured current to the number of photoelectrons generated). In this embodiment, such circuitry may be configured to vary the gain characteristics of the array of FPA 529, and/or of individual pixels in the array of FPA 529, over a time window of interest, e.g., 10 ns, to produce a temporally dependent modulation in the electrical signal associated with each pixel.

Such a temporally dependent modulation may be used to determine the TOF of a laser pulse portion reflected or scattered from a scene. Specifically, a non-modulated signal obtained using FPA 528 may be used as a normalization image, against which the modulated image obtained using FPA 529 may be normalized. Alternatively, a non-modulated image may be obtained using FPA 529 by turning off any modulation for one frame at some interval, which image may be used as a normalization image, against which the modulated image obtained using FPA 529 during the other frames may be normalized; in such an embodiment, beamsplitter 527 and FPA 528 may be omitted. In such an embodiment, it is preferable that objects in the scene do not significantly move between the time the normalization image is acquired and the time the modulated image is acquired or the amount of light received by receiving lens 521 does not change significantly; the frame rate of the FPA optionally may be adjusted to reduce the chance of such movement. The intensity of each normalized pixel represents the TOF of the pulse portions reflected/scattered by the objects in the scene, and thus the distance and shape of those objects. Although there is no absolute reference for the intensity at each pixel, a frame at some periodic frequency during a series of frames could be processed without modulation (e.g., the gain for all pixels set to the maximum value being used). Such a frame provides the absolute amplitude reference, provided that the reflected signal does not change significantly between reference frames.

Alternatively, instead of temporally modulating the gain of each pixel, the amount of light received by each pixel may be temporally modulated by providing a polarization rotator, coupled to a thin polarizer, in front of each pixel. The polarization rotators may be individually addressable, or may be collectively controlled so as to approximately uniformly vary the amount of light received by the pixels. The normalization image may be obtained, for example, analogously to as described above for gain modulation. In another embodiment, the polarization rotator may be omitted and a temporally variable attenuator provided instead. In general, a transducer may be used to vary the amount of photoelectrons that are produced by a pixel of the FPA in a controlled function over 0.1-100 ns. In one embodiment, the transducer acts uniformly on all pixels of the FPA so that only one drive waveform is needed.

In another alternative embodiment, modulator 524 of system 500 includes an electro-optic Bragg deflector, and compensator 525 and beamsplitter 527 are omitted. FPA 528 is positioned to receive one diffraction order from the electro-optic Bragg deflector, and FPA 529 is positioned to receive the zero (or undiffracted beam) diffraction order from the electro-optic Bragg deflector. In some embodiments, the two Bragg orders will be incident on different areas of the same FPA 529. A temporally modulated control signal is applied to the electro-optic Bragg deflector, so as to vary the intensity in the diffraction orders received by FPA 528 and 529 over a time window of interest, e.g., 10 ns. The images received and subsequent processing may be substantially similar to those modulated by the Pockels assembly. In one embodiment, only FPA 528 (or 529) receives a modulated signal, and FPA 529 (or 528) receives a non-modulated signal against which the modulated signal may be normalized.

In yet another alternative embodiment, modulator 524 of system 500 includes an etalon, such as a temporally modulable Fabry-Perot interferometer having opposing reflective surfaces. Polarizer 523, modulator 524, compensator 525, and beamsplitter 527 may be omitted. The transmission of an etalon for monochromatic light is based on the finesse of the etalon and the spacing between the reflective surfaces; thus, by varying the distance between the surfaces as a function of time, the intensity of light transmitted by the etalon to FPA 529 may vary depending on the TOF of the light. In one embodiment, the etalon is solid, with the distance between the reflectors being controllably variable as a function of time using, for example, piezoelectric transducers to compress or stretch the material. FPA 528 may be configured so as to receive non-modulated light, which may be used to obtain a normalization image against which the modulated image from FPA 529 may be normalized.

In the embodiment illustrated in FIG. 3, first and second FPAs 528, 529 are positioned in the focal plane of imaging lens 526, and respectively receive light of orthogonal polarizations. For example, polarizing beamsplitter 527 may direct light of H-polarization onto FPA 528, and may transmit light of V-polarization onto FPA 529. FPA 528 obtains a first image based on a first polarization component, and FPA 529 obtains a second image based on the second polarization component. FPAs 528, 529 provide the first and second images to processor subsystem 540, e.g., to controller 541, for storage and further processing. FPAs 528, 529 may be registered with one another. Such registration may be performed mechanically, or may be performed electronically (e.g., by image constructor 543) using software.

In some embodiments, FPAs 528, 529 are off-the-shelf CCD or CMOS imaging sensors. In particular, such sensors may be readily commercially available for visible-wavelength applications, and require no significant modification for use in system 500. In one example, FPAs 528, 529 are commercially purchased CCD sensors having 2 Megapixel resolution. Some sensors for use in near-infrared applications are currently commercially available, albeit at substantially greater cost than the ubiquitous visible-wavelength sensors, and others are currently being developed. It is anticipated that any of a variety of sensors, including those yet to be invented, may be used successfully in many embodiments of the present invention. Optional FPA 532 may in some embodiments be the same as FPAs 528, 529.

However, sensors having a particular set of characteristics may in some circumstances be preferred. For example, as noted above, providing a focal plane array in which each pixel has a deep electron well, e.g., greater than 100,000 electrons, may enhance the signal to noise ratio obtainable by the system. The focal plane array also, or alternatively, may have a high dynamic range, e.g., greater than 40 dB, or greater than 60 dB. Additionally, wells of such effective depths may be obtained by combining the outputs of pixels of shallower depth (e.g., 4 pixels each having a well depth of 25,000 or more electrons). Preferably, each pixel of the FPA is designed to substantially inhibit "blooming," so that the electrons of any pixels that may become saturated do not bleed over into adjacent pixels.

The processor subsystem 540 includes controller 541, storage 542, image constructor 543, GPS unit 544, and power supply 545. Not all of such components need be present in all embodiments. The functionalities of such components may alternatively be distributed among other components of system 500, including but not limited to on-board processors on FPAs 528, 529. As described above, controller 541 may be in operable communication with one or more elements of illumination subsystem 510, such light source 511 and transmission (Tx) lens 512, and/or of sensor subsystem 520, such as receive (Rx) lens 521, optional FPA 532, modulator 524, and first and second FPAs 528, 529.

For example, the controller 541 may be programmed to control the timing and pulse length of the illumination light pulse generated by illumination subsystem 510. Additionally, the modulator 524 may be configured to modulate the polarization of light pulse portions transmitted there through as a function of time, responsive to a control signal from controller 541. Controller 541 is also in operable communication with storage 542, image constructor 543, GPS unit 544, and power supply 545.

Controller 541 is configured to obtain images from optional FPA 532 and first and second FPAs 528, 529 and to provide the images to storage 542 for storage. Storage 542 may RAM, ROM, a hard drive, flash drive, or any other suitable storage medium. Image constructor 543 is configured to obtain the stored images from storage 542 and to construct three-dimensional images based thereon, as described in greater detail in the '895 patent. GPS 544 is configured to identify the position and/or attitude of system 500 as it obtains images, and to provide such information to storage 542 to be stored with the corresponding images. Additionally, an accelerometer or other suitable attitude measuring device may be used determine an approximate change in attitude of the system 500 from one frame to the next in a series of images. This information may be used as part of a method to register the images to a global or relative reference frame. Power supply 545 is configured to provide power to the other components of processor subsystem 540, as well as to any powered components of illumination subsystem 510 and sensor subsystem 520.

In accordance with one example of the system, an output light pulse is generated by the system and used illuminate a scene so as to obtain distance information. However, in contrast to known MIS-type systems, the illumination light pulse of the presently disclosed system may have a length, defined, for example, as the full-width-half-maximum (FWHM), that is approximately the same length as the modulation waveform, defined, for example, as the time between the 10% and the 90% level of the modulation waveform.

Figure 4:
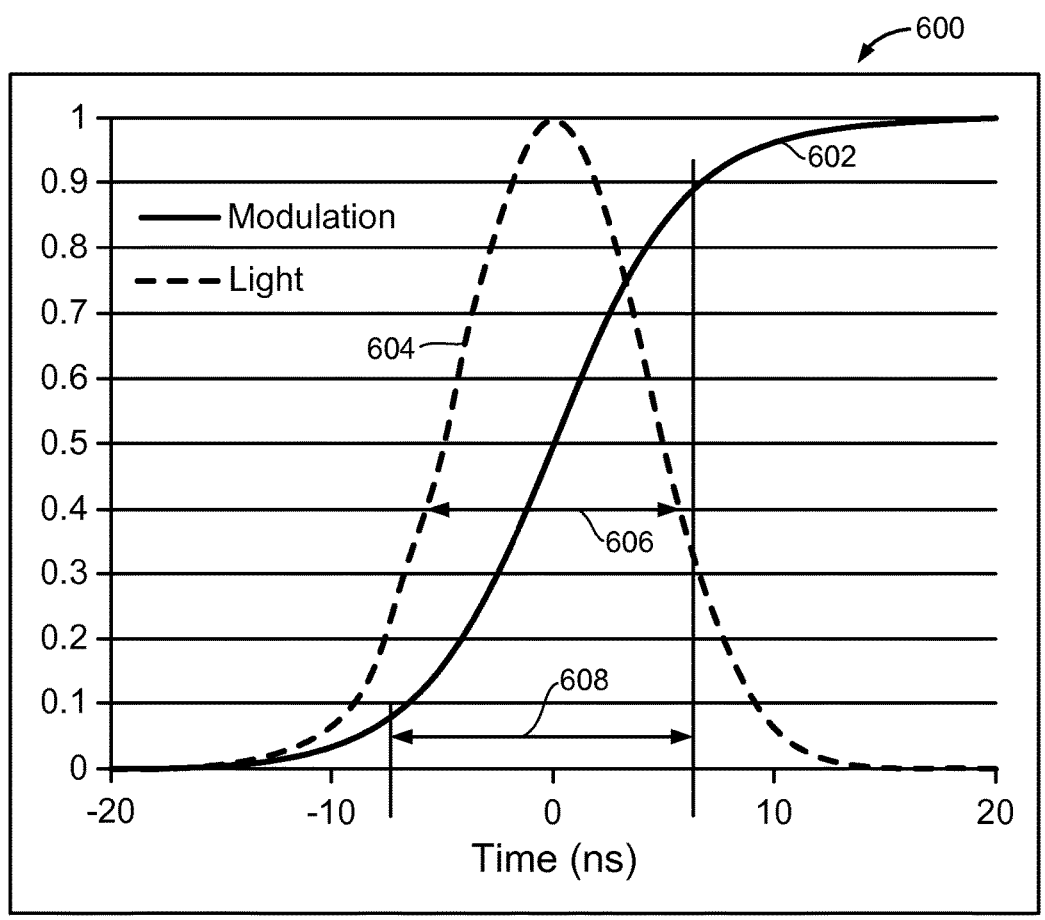
FIG. 4 is a graph showing an example of a transmitted laser pulse and the modulation waveform in time.
Figure 5:
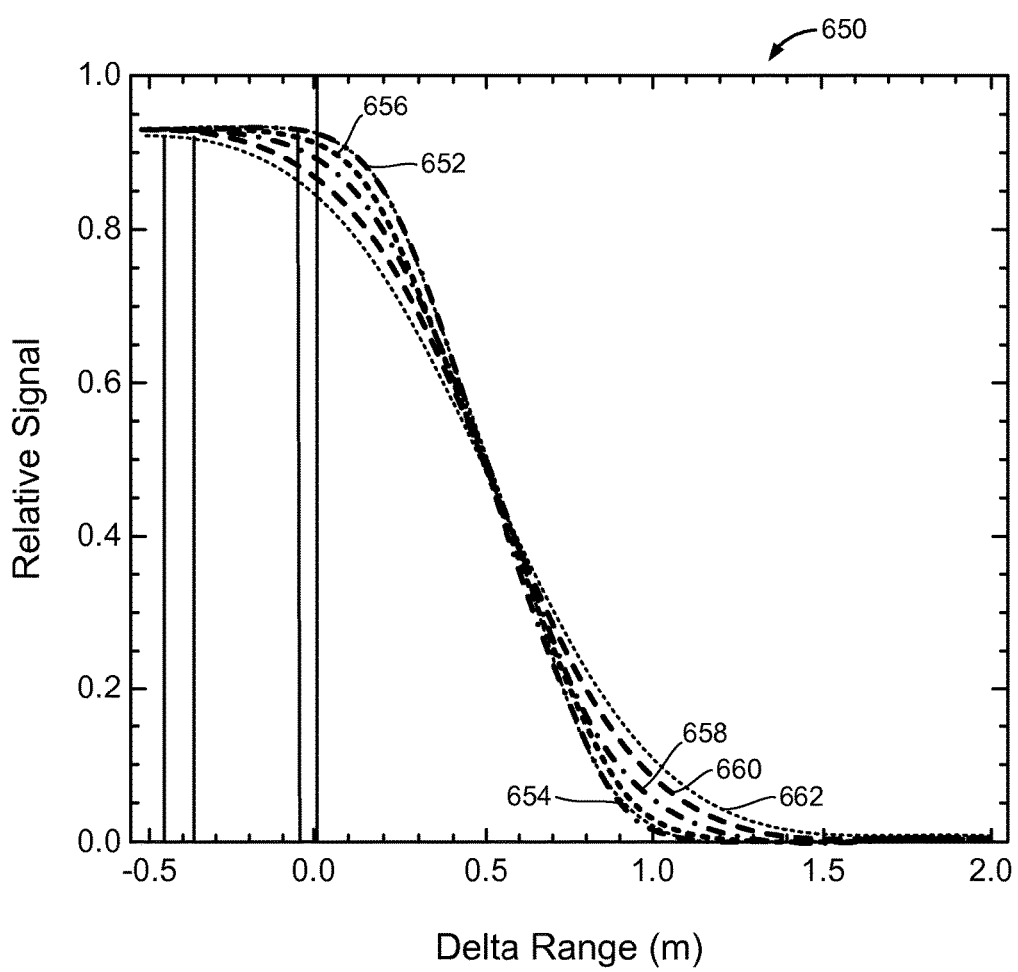
FIG. 5 is a graph showing an example resulting convoluted response function for a 7 nanosecond modulation waveform and a 0.1 nanosecond, 1 nanosecond, 2 nanosecond, 3 nanosecond, 4 nanosecond, and 5 nanosecond long laser illumination pulse.
Figure 6:
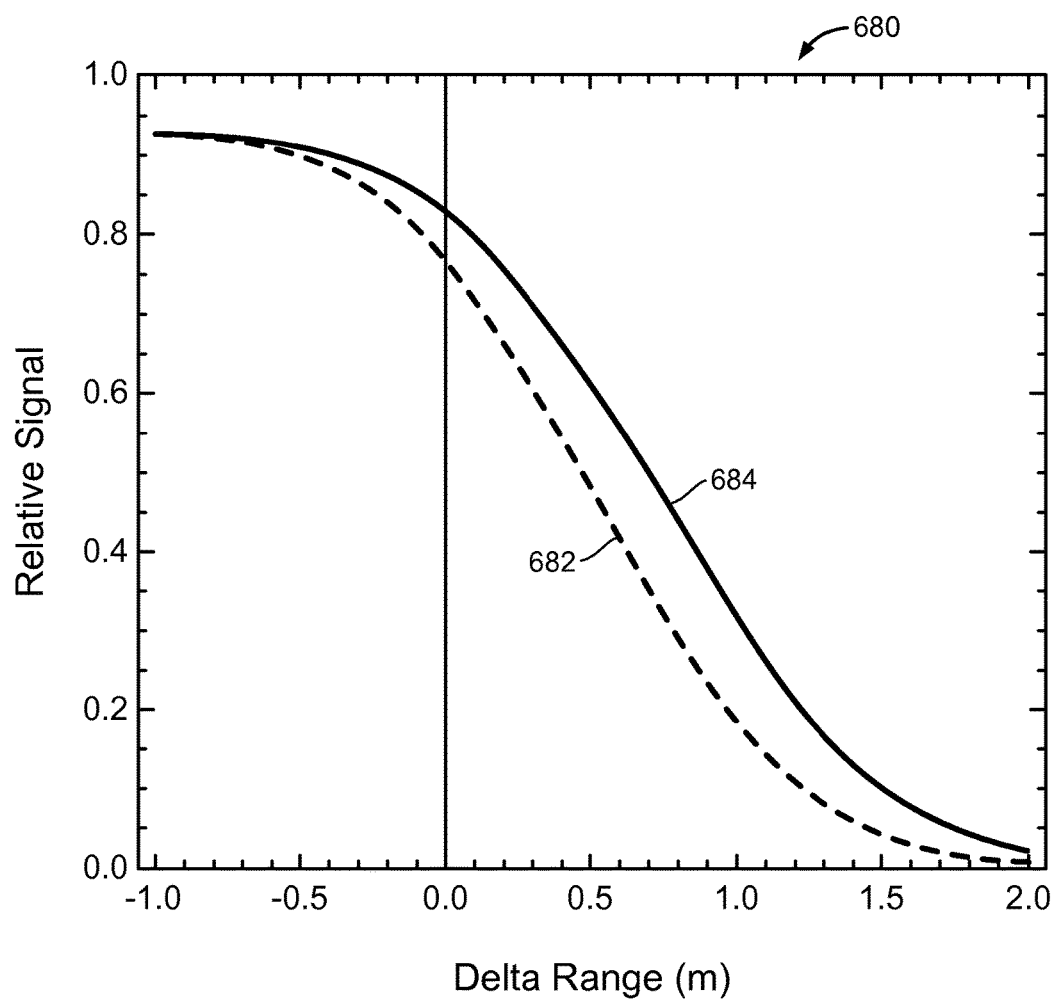
FIG. 6 is a graph showing an example resulting convoluted response function for an 8 nanosecond laser pulse and a 5 nanosecond and a 10 nanosecond long modulation waveform.
Figure 7:
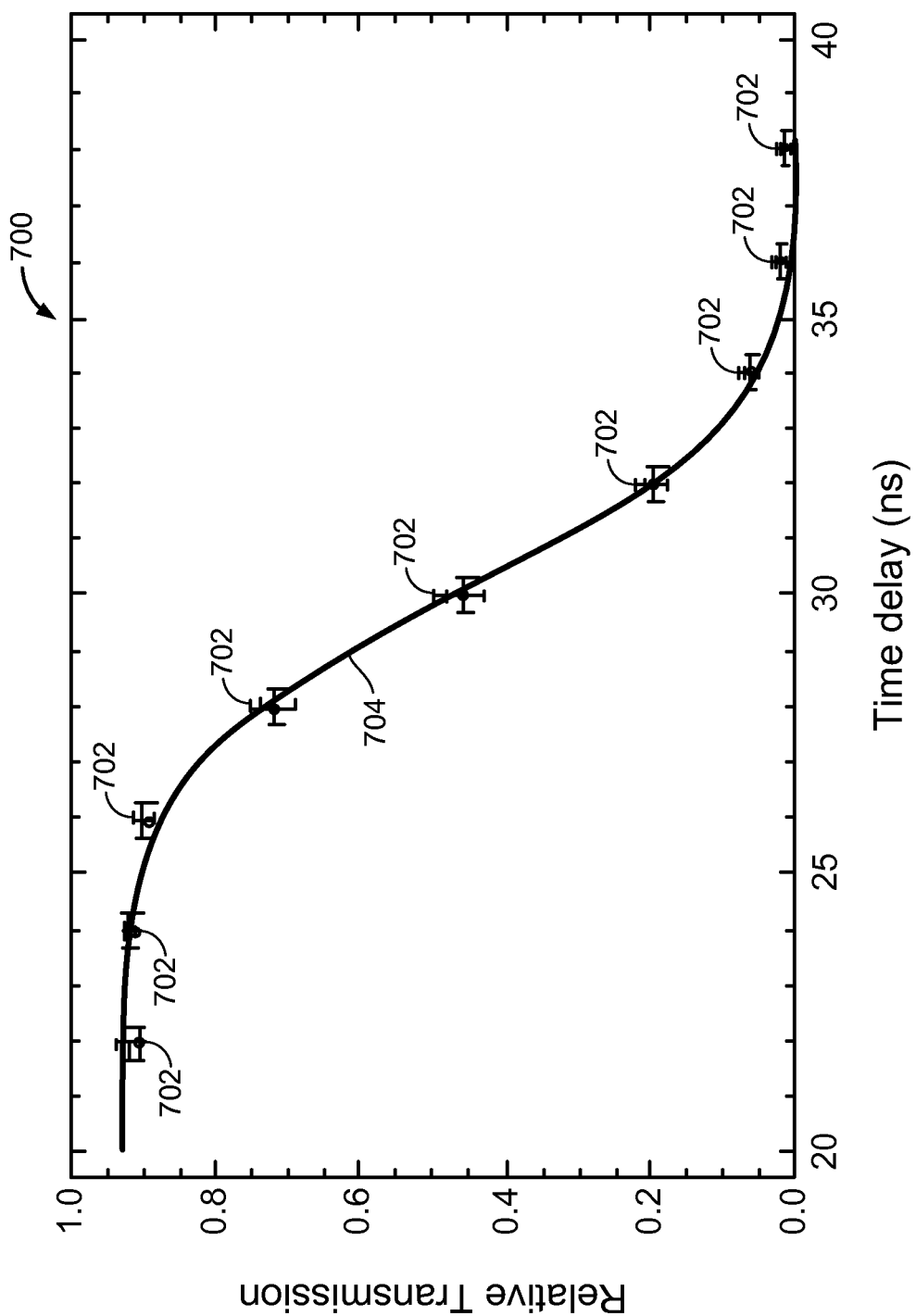
FIG. 7 is a graph showing exemplary discrete response points fitted by a sigmoid analytic function.

An example of the sensor subsystem modulation waveform, for instance, is shown in herein in the graph 600 shown in FIG. 4 as waveform 602, with examples of transmission functions shown at FIGS. 5-7 herein. Generally, the modulation waveform 602 is used by the system to modulate collected portions of the returning light pulse as a function of time so that the arrival time of each portion can be determined.

An example of temporal shapes of the light pulse 604 and the modulation waveform pulse 602 is shown in FIG. 4. The light pulse 604 returns to the 3D imaging system (e.g., system 100 and 500) and the timing circuit initiates the modulation waveform pulse. The relative position in time between the two pulses is determined by the distance traveled by the light that is imaged by each pixel. The signal that is detected by each pixel of the FPA is determined by the convolution of the two signals $$S(r) = \int_{-\infty}^{\infty} f(t) g(r-t) dt \qquad \text{(Eq. 1)}$$

where r is an index value corresponding to the pixel, f(t) is the mathematical description of the light pulse profile in time 604 and g(t) is the mathematical description of the modulation waveform in time 602, such as those shown in FIG. 4. The resultant convolution signal generated by the imaging system 100, 500 for each pixel as a function of distance from the 3D imaging is shown in FIG. 5. In FIG. 5, the convolution signal is shown for several possible lengths for the illumination light pulse, from 0.1 ns to 5 ns, and a modulation waveform length of a 7 ns. In graph 650 shown in FIG. 5, waveform 652 represents the convolution signal for a 0.1 ns illumination light pulse, waveform 654 represents the convolution signal for a 1 ns illumination light pulse, waveform 656 represents the convolution signal for a 2 ns illumination light pulse, waveform 658 represents the convolution signal for a 3 ns illumination light pulse, waveform 660 represents the convolution signal for a 4 ns illumination light pulse, and waveform 662 represents the convolution signal for a 5 ns illumination light pulse.

In this example, the range to the surface corresponding to each pixel in the focal plane array can be determined by identifying the range delay that corresponds on the graph to the intensity signal measured by the pixel. This corresponding range delay can be determined by several means, including an analytic inverse function, by an approximate function that represents the actual convolution response function, by a numeric computer solution and lookup table, or other similar means. The distance resolution is approximately inversely proportional to the slope of the transmission function curve. The processor subsystem 540 and/or its components, e.g., the image constructor 543, can be configured or programmed to perform the foregoing range determinations.

FIG. 5 illustrates the predicted performance of the transmission function for a 3D camera (such as systems 100 or 500) using a 7 ns linear ramp and various laser illumination pulse lengths from 0.1 ns to 5 ns (FIG. 5), and FIG. 6 for an 8 ns laser pulse and 5 ns and 10 ns modulation waveform ramp lengths. In these Figures, "delta range" indicates the range from a reference range from the camera, as determined or set, for example, by the processor subsystem 540. As shown in FIG. 5, there is negligible change in the transmission waveform for pulse lengths less than approximately 1.0 ns (or 14% of the ramp length). The longer light pulses (2 ns, 3 ns, 4 ns, and 5 ns) can cause a change to the convolution signal, reducing the slope of the convolution signal near the center and to lengthen the effective distance window while reducing the linear region. In this example, the distance resolution increases by approximately 40% as the laser pulse length is increased to 5 ns. The shape and pulse length of the laser pulse waveform and the modulation waveform can be adjusted to suit the application and the system design requirements.

FIG. 6 is a graph 680 illustrating exemplary results of other potential configurations of the 3D camera 100, 500. In this configuration the camera uses an 8 ns illumination light pulse. The graph 680 shows the results using said light pulse with a 5 ns modulation waveform ramp (waveform 682), and alternatively, a 10 ns modulation waveform ramp (waveform 684). In this example, a light pulse of 8 ns that is 160% the length of the modulation waveform produces a convolution signal that has a different shape than if the 8 ns light pulse is 80% the length of the modulation waveform. But the temporal length of the convolution signals are not different by a factor of two, even though the modulation waveforms are different by a factor of two. This indicates that the laser pulse length is a secondary effect for high resolution operation of the system.

This ability to use light pulse lengths approximately equal to or longer than the modulation waveform length within a 3D imaging system was verified using the 6 ns laser pulse and a small aperture Pockels cell as a modulator with a 2.5 ns ramp. The transmission of the Pockels cell modulator (shown by the graph 700 of FIG. 7) as integrated into the 3D camera system was measured by recording the images of a flat target at a series of timing delays of the Pockels cell trigger, separated by 2 ns. This change in timing between the laser pulse and the Pockels trigger has the same effect as moving the flat target by c $\Delta t/2$, where c is the speed of light and $\Delta t$ is the time-of-flight. The relative convolution signal (as determined by the ratio $I_1/(I_1+I_2)$) was calculated (where $I_1$ represents the pixel intensity of the first FPA in the camera and $I_2$ represents the pixel intensity of the second FPA in the 3D camera system), and the mean value along with standard deviation was calculated for the intensity ratio across two separate 1000 pixel regions of interest. The resulting relative transmission is shown for the different delay settings in the graph 700 of FIG. 7 as points 702. The vertical and horizontal error bars at the points 702 are the timing jitter of the laser output pulse and the standard deviation of the intensity ratio value over the regions of interest. The line 704 is calculated using a sigmoid fit to the measured high voltage signal modulating the Pockels cell (4.5 ns for 10%-90% levels) and a Gaussian fit to the measured laser pulse temporal profile. The agreement indicates that indeed the laser pulse does not necessarily need to be shorter than the desired range window in order to achieve high distance resolution.

In another example of the 3D camera system 100, 500, instead of measuring the temporal shape and length of the high voltage signal used to create the Pockels cell modulation waveform and that of the light pulse, the convolution signal is measured for each pixel of the FPA for a series of time delays. The temporal shape of the convolution signal is measured, similar to that shown in FIG. 7. An analytic function is fit to this series of points for each pixel in the FPA to create a mathematical function that represents the response for each pixel. The response function can be measured and calibrated, calculated from measured waveforms, and applied using an inverse function. This can be done analytically, using a fitted functional form such as a sigmoid function or its inverse. In other configurations, the response function is measured or calibrated and no analytic function used, and the calibration is stored as a lookup table. The inverse of this mathematical function is then used to calculate the corresponding time delay (or distance) from the measured convolution signal. The processor subsystem 540 and/or its components, e.g., the image constructor 543, can be configured or programmed to perform the foregoing calculations. For a convolution signal such as the one illustrated in FIG. 7, a sigmoid function can be used for the curve fitting.

In another example configuration, the measured data points of the convolution signal can be used to create a lookup table that is then used to determine the corresponding time (and distance) values. Values in between the measured data points can be derived by interpolation of stored values.

Figure 8:
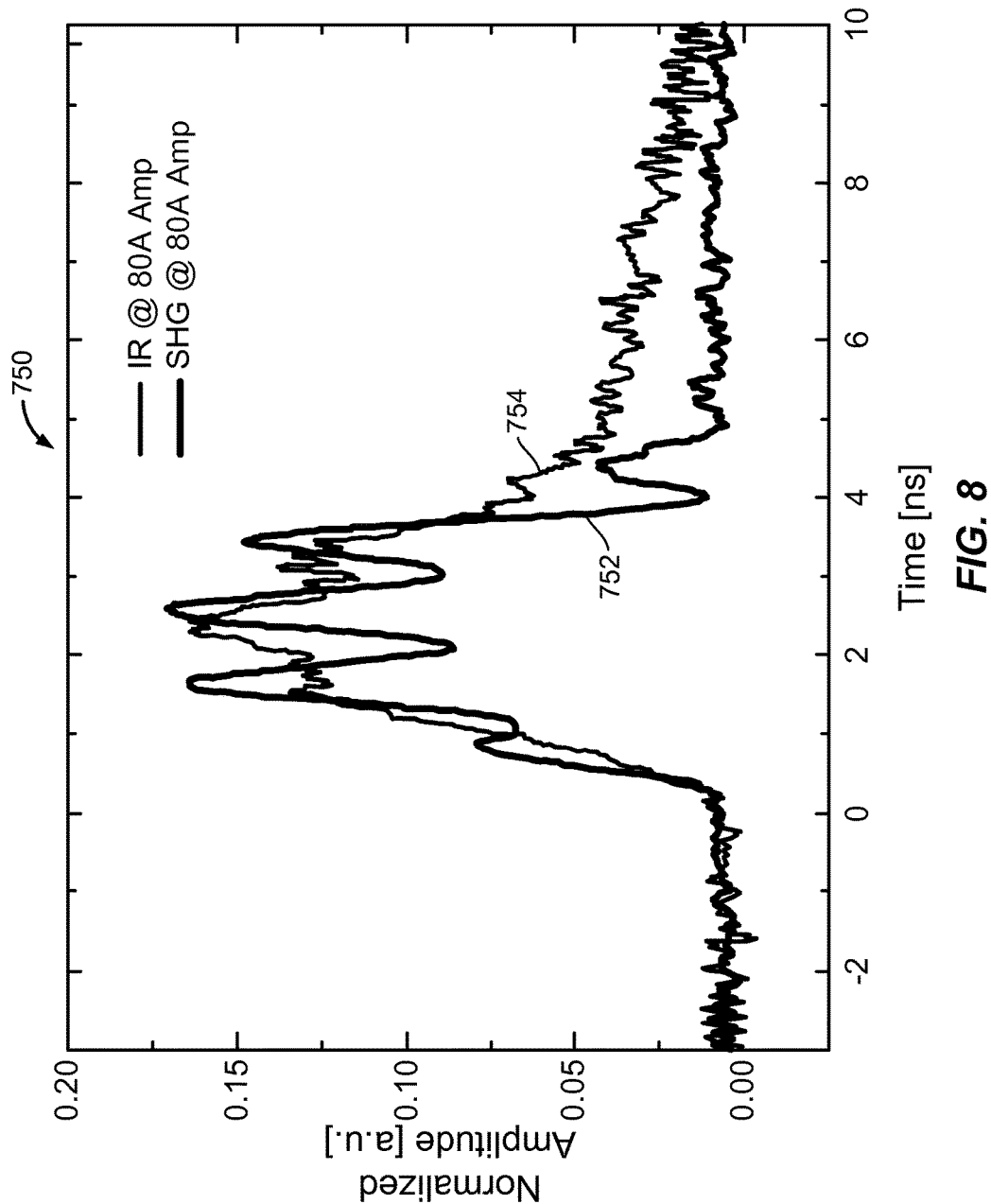
FIG. 8 is a graph showing exemplary modulated illumination laser pulse waveforms.

Another configuration of the 3D camera system 100, 500 uses the convolution signal to make the distance measurement less sensitive to noise on both the light pulse and the modulation waveform. For example, pulses generated by the simplest and most cost effective laser designs can produce pulses that have significant structure on the temporal shape, such as illustrated in FIG. 8. FIG. 8 is a graph 750 showing the temporal pulse profile of two laser pulses, one with large modulation 752 and one with small modulation 754. Such modulation can be due to the beating of multiple spatial or temporal modes from the generating laser or other cause. Because such pulse shapes are not monotonic, such modulation can cause errors in determining the pulse position in time by threshold crossing or peak position or other means. The depth of the higher frequency modulation on the pulse waveform can also change from one pulse to the next. The modulation waveform can also have structure or variation temporally. If the light pulse and modulation waveform are approximately similar in length, e.g., within a factor of 2 or 3, the convolution integral of Eq. 1 acts as an averaging mechanism. In some configurations, averaging or smoothing is effective for factors of 5 or 10 between the light pulse and modulation waveform. Even large variations in temporal shape such as those illustrated in FIG. 8 are averaged to a mean value for each delay. This makes the convolution signal monotonic as illustrated in FIG. 5 even when the individual pulse shapes are not.

The methods and systems disclosed herein improve upon previous 3D imaging techniques by making use of a longer illumination pulse to obtain the same or nearly the same range resolution as can be achieved by using a much shorter, conventional laser pulse. For example, a longer illumination pulse can be produced by a Q-switched laser that produces, for example, 5, 10, 20 ns or longer pulses. One or more Q-switched lasers may be used for illumination in the system. In some instances, the laser pulse can be longer than the modulation waveform of a LIMARS- or MIS-type imaging system and still produce an acceptable response function. The light pulse generation technologies required to achieve longer pulse lengths can be significantly less expensive and complex than known technologies presently used to generate shorter illumination pulse lengths. Lower-cost, lower-complexity light pulse sources may facilitate lower-cost, commercial 3D camera products.

With the techniques disclosed herein, even a 10 ns or 15 ns laser pulse, for example, (measured at its FWHM), that is 3.3 m or 5 m long can be used to obtain mm-class resolution distance measurements. This has not been previously done with time-of-flight distance measurement imaging systems.

In addition, another benefit of the longer laser pulses is that they may function to smooth out or average out higher frequency modulation or errors in either the laser pulse temporally or in the imaging system modulation waveform. As long as the centroid or its equivalent is approximately unchanged or can be measured during operation, the range determined from the 3D camera will be independent of these modulations.

The techniques described herein permit the use of lower cost semiconductor illumination sources in high resolution LIMARS-type or MIS-type 3D imaging systems. Semiconductor illumination sources, such as light emitting diodes (LEDs) or laser diodes, typically output longer pulses and have lower peak power. The ability to obtain high resolution with longer illumination pulses makes it possible to use these types of illumination sources for a time-of-flight imaging system. Such illumination light sources are generally lower cost, and thus, more likely to be able to scale to higher volume, low-cost, commercial 3D camera products.

Other embodiments and modifications of the methods, devices, systems and apparatuses described above will occur readily to those of ordinary skill in the art in view of these teachings. Thus, the foregoing description is illustrative and not restrictive. The invention is to be limited only by any patent claims based on this disclosure, which cover all such other embodiments and modifications, when viewed in conjunction with the above specification and accompanying drawings. The scope of the invention should, therefore, not be limited to the above description, but instead should be determined with reference to the claims along with their full scope of equivalents.

What is claimed is:

1. A three-dimensional imaging system, comprising:
an illumination source configured to emit a light pulse having a length;
a light receiving subsystem configured to receive a portion of the light pulse reflected or scattered by a scene and also configured to temporally modulate the received portion of the light pulse with a predetermined modulation waveform having a predetermined length, wherein the length of the light pulse is greater than or equal to 10% of the length of the modulation waveform; and
a processor configured to:
produce a convolved signal based on the light pulse and the modulation waveform, and
determine a range of at least one object in the scene based on the convolved signal, wherein the range is calculated using a lookup table of values relating the convolved signal to the range or time, and wherein the values in the lookup table correspond to regions of pixels.

2. The three-dimensional imaging system of claim 1, wherein the length of the light pulse is greater than or equal to 5 nanoseconds.

3. The three-dimensional imaging system of claim 1, wherein the length of the light pulse is greater than or equal to 10 nanoseconds.

4. The three-dimensional imaging system of claim 1, wherein the length of the light pulse is greater than or equal to 20 nanoseconds.

5. The three-dimensional imaging system of claim 1, wherein the illumination source is selected from the group consisting of one or more Q-switched lasers, one or more semiconductor lasers, one or more laser diodes, and one or more light emitting diodes (LEDs).

6. The three-dimensional imaging system of claim 1, wherein the light pulse emitted by the illumination source has a leading edge or falling edge that is non-monotonic.

7. The three-dimensional imaging system of claim 1, further comprising means for producing monotonic convolution signal when either the illumination source or the modulation waveform has a high frequency modulation.

8. The three-dimensional imaging system of claim 1, wherein the range is determined using an analytic approximation to range as a function of the convolved signal.

9. The three-dimensional imaging system of claim 1, further comprising means for interpolating between values stored in the lookup table.

10. The three-dimensional imaging system of claim 1, wherein the system is configured so that smallest achievable range resolution is less than 10% of the light pulse length.

11. The three-dimensional imaging system of claim 1, wherein the system is configured so that smallest achievable range resolution is less than 1% of the light pulse length.

12. A method of three-dimensional imaging, comprising:
emitting a light pulse having a length to illuminate a scene, at least in part;
receiving a portion of the light pulse reflected or scattered by the scene; and
temporally modulating the received portion of the light pulse with a predetermined modulation waveform having a predetermined length, wherein the length of the light pulse is greater than or equal to 10% of the length of the modulation waveform;
producing a convolved signal based on the light pulse and the modulation waveform; and
determining a range of at least one object in the scene based on the convolved signal, wherein the range is calculated using a lookup table of values relating the convolved signal to the range or time, and wherein the values in the lookup table correspond to regions of pixels.

13. The method of claim 12, wherein the length of the light pulse is greater than or equal to 5 nanoseconds.

14. The method of claim 12, wherein the length of the light pulse is greater than or equal to 10 nanoseconds.

15. The method of claim 12, wherein the length of the light pulse is greater than or equal to 20 nanoseconds.

16. The method of claim 12, wherein the light pulse is produced by an illumination source selected from the group consisting of one or more Q-switched lasers, one or more semiconductor lasers, one or more laser diodes, and one or more light emitting diodes (LEDs).

* * * * *